(12) United States Patent
Bailey et al.

(10) Patent No.: US 6,267,850 B1
(45) Date of Patent: Jul. 31, 2001

(54) SEPARATION OF ISOTOPES BY IONIZATION

(75) Inventors: Geoffrey Horrocks Bailey, Preston; Colin Whitehead, Clywd; Paul Gilchrist, Preston; Duncan Alfred Webster, Nr. Chester, all of (GB)

(73) Assignee: British Nuclear Fuel PLC, Cheshire (GB)

(*) Notice: Subject to any disclaimer, the term of this patent is extended or adjusted under 35 U.S.C. 154(b) by 0 days.

(21) Appl. No.: 09/142,781

(22) PCT Filed: Mar. 12, 1997

(86) PCT No.: PCT/GB97/00671

§ 371 Date: Dec. 21, 1998

§ 102(e) Date: Dec. 21, 1998

(87) PCT Pub. No.: WO97/34684

PCT Pub. Date: Sep. 25, 1997

(30) Foreign Application Priority Data

Mar. 15, 1996 (GB) .................................. 9605435
May 21, 1996 (GB) .................................. 9610606
Feb. 27, 1997 (GB) .................................. 9704078

(51) Int. Cl.$^7$ ...................................... H05F 3/00
(52) U.S. Cl. ................. 204/164; 204/157.2; 422/186
(58) Field of Search ........................ 204/157.2, 155, 204/156, 164; 422/186

(56) References Cited

U.S. PATENT DOCUMENTS

| | | | |
|---|---|---|---|
| 4,090,855 | * 5/1978 | Hora et al. | ................. 55/2 |
| 4,093,856 | 6/1978 | Stenzel . | |
| 4,208,582 | 6/1980 | Arnush . | |
| 4,213,043 | 7/1980 | Dawson . | |
| 4,786,478 | * 11/1988 | Ahmed et al. | ......... 422/186.03 |
| 5,422,481 | * 6/1995 | Louvet | ................. 250/291 |

FOREIGN PATENT DOCUMENTS 2363364  3/1978 (FR) .

OTHER PUBLICATIONS

Database Inspc. Institute of Electrical Engineers, Stevenage, GB Inspct No. an 1262588, "Experimental Study of a Beam–Plasma Discharge in Crossed Electric and Magnetic Fields," vol. 4, No. 4, Jul.–Aug. 1978, pp. 842–849.

Database Inspc. Institute of Electrical Engineers, Stevenage, GB Inspec No. an 1250371, "A Beam–Plasma Discharge in Crossed Electric and Magnetic Fields," vol. 237, No. 1–2, Nov. 1977, SSSR, pp. 68–70.

Isotope Separation by Ionic Cyclotron Resonance, P. Louvet, Workshop on Separation Phenomena in Liquids adn Gasses, Darmstadt, Jul. 20–23, 1987.

Study of Selective Heating at Low Cycloron Resonance for the Plasma Separation Process, A. Compant LaFontaine and Pashkovsky, VG, Phys. Plasmas 2, American Institute of Physics, Dec. 12, 1995.

Ion Cyclotron Resonance Heating for the Plasma Separation Process, A. Compant LaFontaine, 1994 American Institute of Physics. No month available.

* cited by examiner

Primary Examiner—Kathryn Gorgos
Assistant Examiner—Wesley A. Nicolas
(74) Attorney, Agent, or Firm—Workman, Nydegger & Seeley

(57) ABSTRACT

Improved processing apparatus and methods are provided which involve the selective ionisation of a feed material and the separation of ionised and non-ionised species. Introduction of a chemical material to cause selective transition to a non-ionised and/or solid or liquid state of part of the feed is provided. The process offers high through puts by virtue of the ionised and non-ionised species being in equilibrium with one another.

33 Claims, 5 Drawing Sheets

SEPARATION OF ISOTOPES BY IONIZATION

This invention concerns improvements in and relating to processing, particularly, but not exclusively to the processing of nuclear fuel materials and materials involved in the nuclear fuel industry.

The production and recycling of fuel grade nuclear fuel and associated materials involve long and complex processes. For instance, starting from mined uranium ore, in general terms the process involves taking the ex-mine grade material and gradually converting and enriching it until it is in a form and of a grade suitable for producing fuel pellets.

Intermediate stages in the overall process route form the starting point for the production of a variety of other materials too.

The basic stages in the overall process are the concentration of the initial uranium oxides as uranyl nitrate hexahydrate; a de-nitration stage to convert the material into $UO_3$; a reduction stage to convert the $UO_3$ to $UO_2$; a hydro-fluorination stage to form $UF_4$; a further fluorination stage to produce $UF_6$; an enrichment procedure by physical or chemical means; and the conversion of $UF_6$ in its enriched form to ceramic grade $UO_2$ which is in a suitable form to be formed into fuel pellets.

Recycling of spent fuel similarly involves a series of complex chemical and physical steps to separate the various fission products from the depleted fuel and to upgrade the 235U concentration in the material to a stage where once again it can be employed as fuel by separating out other components present in the used fuel.

The complexities of these processes are also present in other production processing lines involved in or relating to fuel cycles, such as thorium, plutonium and gadolinium amongst other materials. The production of uranium metal, non-enriched, for instance for use in Magnox reactors, also involves complex processing.

Extensive or involved processing is also encountered in the production of other materials outside the immediate nuclear fuel field. For example, the commonly employed production route for titanium, niobium and rhodium metal, amongst others, involves the rendering of the metal containing compounds into an halide form followed by its decomposition from the halide form to the metal.

Substantial processing plants, in terms of their size, capital investment and running costs, are necessary to perform the stages involved in all of these processes. Attendant problems also follow from the various processes and their requirements. For instance, processes involving fluorination involve a complex and hazardous electrolysis process to produce the fluorine required.

The present invention aims to provide an alternative processing route for many processes and/or a process for rendering materials into more useful forms and/or a process for recycling materials, together with apparatus for achieving the processes.

According to a first aspect of the invention we provide a process comprising the steps of:
a) providing a feed, the feed consisting of mixed components;
b) converting said feed into a plasma or ionised form;
c) providing at least one component in at least partially ionised form and at least one different component in at least partially non-ionised form;
d) containing said plasma/ions in a magnetic field; and
e) separating said ionised components from said non-ionised components.

The component desired may be extracted from a mixture of isotopes and/or elements of both metal and non-metal nature. The separation may be complete or partial.

The provision of the feed in a nitrogen containing compound is envisaged, but provision of the feed in a fluorine containing form is particularly preferred. Feed material consisting of uranyl nitrate, uranium hexafluoride, plutonium nitrate, thorium nitrate, depleted uranyl nitrate, depleted uranium hexafluoride or mixtures thereof all represent suitable feed materials. Other suitable feed materials include spent nuclear fuel, uranium tetrafluoride and other metals in halide forms, such as titanium tetrachloride. These materials may be in hydrated form.

The mixed components may consist of two or more different elements; two or more different isotopes of the same element; different elements together with different isotopes of one or more of those elements; or compounds and/or mixtures of compounds incorporating different elements, different isotopes or different isotopes and different elements, and reference in this application to the term components should be taken to include all such possibilities, amongst others, unless stated to the contrary.

The feed may be introduced to the magnetic field as a gas, liquid, solid or mixture of states. A gas feed to the magnetic field is preferred.

The feed may be introduced to the plasma generation means as a gas, liquid, solid or mixture of states.

The feed may be introduced to the ionisation means as a gas, liquid, solid or mixture of states. A gas feed to the ionisation means is preferred, particularly where a plasma generator is not also provided.

The feed may be provided in gaseous form by boiling and/or evaporation and/or sublimation of a solid or liquid initial feed. The conversion to gaseous state may be effected by a furnace, microwave heater or other form of heater means. Preferably the gas is introduced prior to ionisation.

Preferably all, or substantially all, of a given component is ionised. Preferably all, or substantially all, of a given component is not ionised.

Preferably some or all metallic elements present in said feed are Ionised. The ionisation of metallic elements with an atomic weight greater than 90 is particularly preferred. Preferably some or all non-metallic elements in said feed are not ionised. Preferably all elements with an atomic weight below 90, most preferably below, 70 and ideally below 60, are left in non-ionised form. It is particularly preferred that elements such as uranium and/or plutonium and/or thorium and/or gadolinium are ionised. It is preferred that elements such as hydrogen and/or fluorine and/or oxygen and/or nitrogen are not ionised. Preferably boron is not ionised. Preferably fission products are not ionised.

The ionisation of the components may be caused by the temperature of the plasma. Additionally or alternatively the ionisation of the components may be caused by the interaction of the components with high energy electrons produced by electron cyclotron resonance.

The extent of ionisation and/or components ionised may be controlled by the energy input of and/or residence time in the electron cyclotron resonance unit.

Preferably the ionisation is controlled by the level of energy input. The level of energy input may be controlled by controlling the temperature of the plasma. Preferably the energy input is not selective between components of the feed. In this way all of the components of the feed are preferably raised to the same energy level. Preferably the ionised and non-ionised feed components are in equilibrium with one another for the prevailing conditions.

The feed material may be converted to a gas and fed to an ECR unit for ionisation. A furnace heater or evaporator may be used to convert the solid or liquid feed to gaseous/vapour form.

In a particular embodiment, therefore, the plasma may convert the feed materials to discrete atoms and electron cyclotron resonance may subsequently give rise to at least partial ionisation, preferably of a selective nature.

The feed may be provided in molecular form and be converted to discrete atoms and/or elemental forms by the plasma generation and/or ionisation means and/or heating means. The conversion to discrete atoms and/or elemental forms may give rise to partial ionisation of one or more of the resulting species. Thus a uranyl nitrate hexahydrate feed may be converted to U, N and H (discrete atomic forms), together with N2 and O2 (elemental forms), as well as U+ (ionised species). Preferably the feed is provided in molecular form and selectively separated as discrete atoms and/or elemental forms from ionised discrete atomic forms and/or elemental forms. This renders the technique applicable to a wider variety of materials than are possible with elemental feed and separation in elemental form or molecular feed followed by separation in molecular form.

The temperature of said plasma may be controlled to provide selective ionisation of the components in the desired way. Thus the plasma may ionise some components in the feed but leave other components, such as fission products and/or non-metallic elements, un-ionised.

Preferably said plasma is provided at 3000 to 4500K. Preferably said plasma is generated by microwave or radio frequency means. Preferably the plasma in the generator is operated at between 1000 and 10000 Pa. A value of 2000+/−10% is preferred.

Additionally or alternatively the residence time of the feed within the plasma prior to the separation may be controlled to provide selective ionisation of the components in the desired way.

Preferably the feed is introduced into the containing magnetic field in un-ionised form. Preferably the partial ionisation process occurs within the magnetic field on an uncharged gas. The gas may be in molecular and/or atomic form.

The magnetic field may be configured to define a cylindrical active volume in which the plasma/ions are processed. Preferably the plasma/ions pass along the axis of this containment area from the plasma generation and/or ionisation means to the next, separation, stage.

Preferably the separation of ionised and un-ionised components is affected by removing the un-ionised component from the plasma, most preferably as a gas. The un-ionised components may be pumped away from the ionised component. The ionised component is contained and hence restrained by the magnetic field.

The separation of ionised from non-ionised components may be effected in a number of stages. Preferably the stages are discrete from one another. The stages maybe separated from one another by a baffle provided with an aperture. Preferably the aperture is entirely within the containment area of the magnetic field. Preferably one or more of the stages are operated at different pressures to one or more other stages. The pressure level may be maintained by the pumping level employed. Preferably the pressure in one or more stages near to the inlet is higher than one or more further away from the inlet. Preferably the pressure decreases for each zone relative to the preceding stage nearer the inlet. Preferably the pressure in each stage is 30% to 60% of that in the preceding stage, progressing away from the inlet.

Preferably three stages are provided. Each stage may be between 0.5 and 2 m in length.

Preferably the first stage is operated at between 10 and 50 Pa. A level of 40 Pa+/−10% is preferred.

Preferably the second stage is operated at between 5 and 20 Pa. A level of 16 Pa+/−10% is preferred.

Preferably the third stage is operated at between 2 and 10 Pa. A level of 7 Pa+/−10% is preferred.

The separated un-charged components may be recycled for subsequent use and/or subjected to further processing. This may include further selective ionisation and/or selective processing to separate different components.

The separated charged components are preferably still contained in a magnetic field. The separated charged components may be subjected to further processing including selective de-ionising; de-ionising followed by further selective ionisation; or other selective processing to separate different components.

The charged components may be cooled, and/or discharged to provide a liquid and/or solid uncharged product. The charged components may be collected on an earthed or charged grid, plate, electrode or mass of the product itself. The charged components may be collected in a vessel or container. A reservoir of liquid may be provided in the vessel or container.

The temperature conditions may be controlled to purify the collected components by vaporising off impurities. The impurities may be vaporised in the form of compounds with the metal and/or collected component. Vaporisation of halides is envisaged.

The collected charged components may be periodically or continuously removed from the collection point.

The method may comprise the further step of introducing a chemical material, preferably at a controlled kinetic energy level, and contacting this with the remaining charged component(s), the kinetic energy level of the charged component and chemical material being such that an un-charged component or particle results. The component may still be present as a gas.

The chemical material may consist of a material selected to give the desired uncharged particle and/or end product, such as oxygen or an inert gas as the chemical material. The chemical material may be added at a temperature of between 100K and 2000K and particularly 100K to 500K. The component and chemical material may be combined in the resulting particle. An oxide represents a potential form.

The temperature of the combined form may be controlled so as to provide the particle in the desired form. A temperature of 2500K is preferred with uranium so as to present the uranium as gaseous $UO_2$ as the principle form.

A step may be provided in Which a further chemical material is added to the un-charged component so as to reduce the kinetic energy level to a stage where a solid product is produced. Alternatively or additionally the kinetic energy level reduction can be provided by impacting the uncharged component on a surface, preferably a cooled surface. The kinetic energy level reduction for the uncharged particle may occur very rapidly so as to avoid undesired intermediate equilibrium forms of the product. A transition period of <2 ms is preferred.

The further chemical material may be the same or different from the chemical material previously added.

Preferably the product of the process is the desired compound, element or isotope and preferably at the desired grade. Ceramic grade metal oxide is a particularly preferred product of the process although pure metal can also be produced in this way. Uranium, plutonium, thorium and indeed MOX products can be produced by controlling the process conditions.

According to a second aspect of the invention we provide separation apparatus, said apparatus comprising:

a) a plasma/ion generator;
b) means for selectively ionising a feed material of mixed components;
c) magnetic field generating means producing a magnetic field for containing the plasma/ions; and
d) means to remove un-charged components from the magnetic field.

The feed may be provided as a solid, liquid or gas.

A furnace, heater, microwave source, evaporator or other heating means may be used to heat and/or vaporise and/or sublime and/or gasify and/or evaporate the feed.

Preferably the plasma/ions are generated by microwave or radio frequency heating. The ionisation of the components may be caused by the temperature of the plasma.

Preferably the plasma is heated to between 3000 and 4500K and most preferably 4000K+ or −10%. Preferably the outlet from the plasma/ion generator is between 20 and 40 mm in radius.

The plasma generator may act as the means for selectively ionising the feed material mixed components. Alternatively or additionally high energy electron collisions produced by electron cyclotron resonance means may provide the means for selectively ionising the feed material of mixed components.

The feed may be fed to the ECR as a molecular and/or atomic gas.

Preferably the extent of ionisation and/or components ionised are controlled by the level of energy input. The energy level may be controlled by the temperature. Preferably the feed is excited evenly. Preferably the energy input is not selective between components present. Preferably the partial ionisation/partial non-ionisation of the feed resulting is at equilibrium for the prevailing conditions.

The containing magnetic field may be axially aligned.

Preferably the magnetic field generating means comprises one or more solenoids. Preferably the magnets are provided in an annular or cylindrical assembly. In this way a central containment area is defined by the magnetic field, preferably of cylindrical configuration. Preferably the magnetic field is provided as a containment field most preferably in an axial alignment. Field strengths in excess of 0.075 tesla or in excess of 0.1 tesla may be used for this purpose.

Preferably the feed is introduced to the magnetic field before ionisation.

Preferably the separation is affected by removing the unionised component from the plasma. Preferably the means for removing un-charged components comprise a pump unit. Preferably the charged components are retained in the magnetic field.

The un-ionised components may be separated from the feed in one or more stages. Preferably one or more outlets through which the un-ionised components are withdrawn are provided in each stage.

Preferably the stages are separated from one another by a baffle element. Preferably the baffle is provided with a circular aperture through which the feed passes. Preferably the apertures in the baffles are axially aligned. The diameter or size of the aperture in one or more baffles may be greater than the aperture in one or more baffles nearer the feed inlet than said aperture. Preferably the apertures increase in diameter sequentially away from the feed inlet.

Preferably the aperture has a radius substantially corresponding to the plasma/ion stream radius at that distance from the inlet. Preferably the aperture radius is the same or less than 10% larger than the plasma/ion stream radius at that location. Preferably the radius of one or more of the apertures is approximately proportional to the fourth root of the distance from the inlet or plasma generator nozzle.

Preferably the aperture radius is less than the radius of the containment area defined by the magnetic field at that location.

The apparatus may further provide addition means for a chemical material to the remaining process stream. Preferably the chemical material introduced is oxygen or an inert gas. It is particularly preferred that the chemical material added provides a quenching and/or cooling action to the remaining components. Preferably the chemical material on contacting the remaining components converts it from a charged to an uncharged phase. Most preferably the component is still retained in the gaseous state following this change.

In a particularly preferred embodiment the addition of oxygen is employed as the chemical material. Preferably this is introduced at 100 to 500K to give an approximate combined temperature of 2500K in combination with the charged component. At this temperature for instance, U is retained as an uncharged gas primarily in the form $UO_2$.

A still further means for addition of a further chemical material may be provided. Preferably this further addition converts the process stream from a gaseous to solid state. Alternatively or additionally the kinetic energy level reduction can be provided by impacting the uncharged component on a surface, preferably a cooled surface. The conversion is preferably obtained very rapidly indeed so as to restrict any intervening equilibrium states forming. Preferably the product is a ceramic grade fuel material, such as $UO_2$.

According to a third aspect of the invention we provide a process comprising the steps or:

a) providing a feed, the feed consisting of mixed components;
b) converting said feed into a plasma/ionised form;
c) providing at least one component in at least partially ionised form and at least one component in at least partially non-ionised form;
d) containing said plasma/ions in a magnetic field; and
e) separating said ionised components from said non-ionised components; and further comprising converting at least some of the separated ionised component or components to an un-charged form.

The component may be converted to uncharged form by reducing its kinetic energy level, i.e. to condense it.

The component may be converted to uncharged form by impacting it on a surface, preferably a cooled surface.

The component may be converted to uncharged form by addition of a chemical material. A combination of one or more of these may be used.

Preferably the chemical material is added at a predetermined kinetic energy level so as to give the desired un-charged form. Most preferably the un-charged form is in a gaseous form. Conversion of one, or a portion of one or more components to the un-charged form, whilst retaining one or more other components, or a portion of one or more other components and/or a portion of the first component or components in charged form is envisaged.

The addition of the chemical material, or the addition of further chemical material in a further stage, may be such so as to reduce the kinetic energy level to a stage where a solid product is produced.

The chemical material added may react with the component or may simply reduce its kinetic energy level. The component may be produced in elemental or compound form.

Preferably the transition from un-charged gaseous particle to solid product occurs very rapidly. A transition period of less than 2 ms is preferred.

The separation of uranium and fluorine from a uranium hexafluoride feed is one potential use. Additionally the separation of uranium from uranyl nitrate hexahydrate and other feed forms is envisaged.

The further processing and subsequent use of the uncharged components separated from the charged components is envisaged. The production or recycling of fluorine using this route is aparticulariy preferred form.

This aspect of the invention may of course include any of the features or possibilities discussed elsewhere in this application, including those relating to the ion/plasma generation, its containment, the manner of the separation and others.

According to a fourth aspect of the invention we provide separation apparatus said apparatus comprising:

a) a plasma/ion generator;
b) means for selectively ionising the feed material of mixed components;
c) magnetic field generating means producing a containing magnetic field for the plasma/ions;
d) means for removing uncharged components from the magnetic field; and
e) means for converting at least some of the separated charged components to uncharged form.

The component may be converted to uncharged form by reducing its kinetic energy level, i.e. to condense it.

The component may be converted to uncharged form by impacting it on a surface, preferably a cooled surface.

The component may be converted to uncharged form by addition of a chemical material. A combination of one or more of these may be used.

The chemical material may he introduced in a single or in multiple stages. Where multiple stages are used it is preferred that the various inlets be spaced from one another along the direction of the process stream travel. Thus first means may be provided to effect a transition from a charged to un-charged state and second or further stages may be provided to convert the un-charged component to the solid state or to the desired chemical composition. The production of both elemental and compound forms of the desired product is envisaged.

Of course other features of the apparatus or methods discussed elsewhere in this application can be equally relevant to this aspect.

According to a fifth aspect of the invention we provide components, materials, compounds, elements, or isotopes separated according to the first and/or third aspects of the invention and / or using the apparatus of the second and/or fourth aspects of the invention and/or further processed forms thereof.

The separated components may be different elements presented in the feed. Thus the separation of uranium from fluorine is envisaged, as is the separation of other elements present in one or more given compounds from each other. The production of ceramic grade metal oxides suitable for fuel use is envisaged.

The degree of separation between the components may be substantially complete or only partial. Thus processes in which a proportion of the component in the feed is extracted as un-charged components in the process whilst the majority of that component continues into the product stream produced from the charged components is envisaged.

Of course the un-charged first or second product stream may constitute the useful and aimed for separated component as much as the final end product from the charged component.

According to an sixth aspect of the invention we provide a fuel pellet, fuel rod or fuel assembly or part for a nuclear reactor incorporating the product, or a further processed product, of any of the first to fifth aspects of the invention.

Various embodiments of the invention will now be described, by way of example only, and with reference to the accompanying drawings in which.

Figure 4:
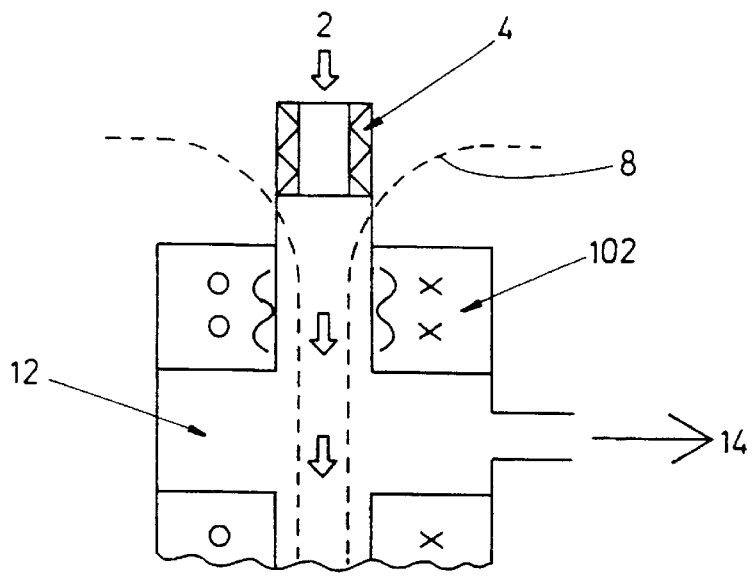
Figure 5:
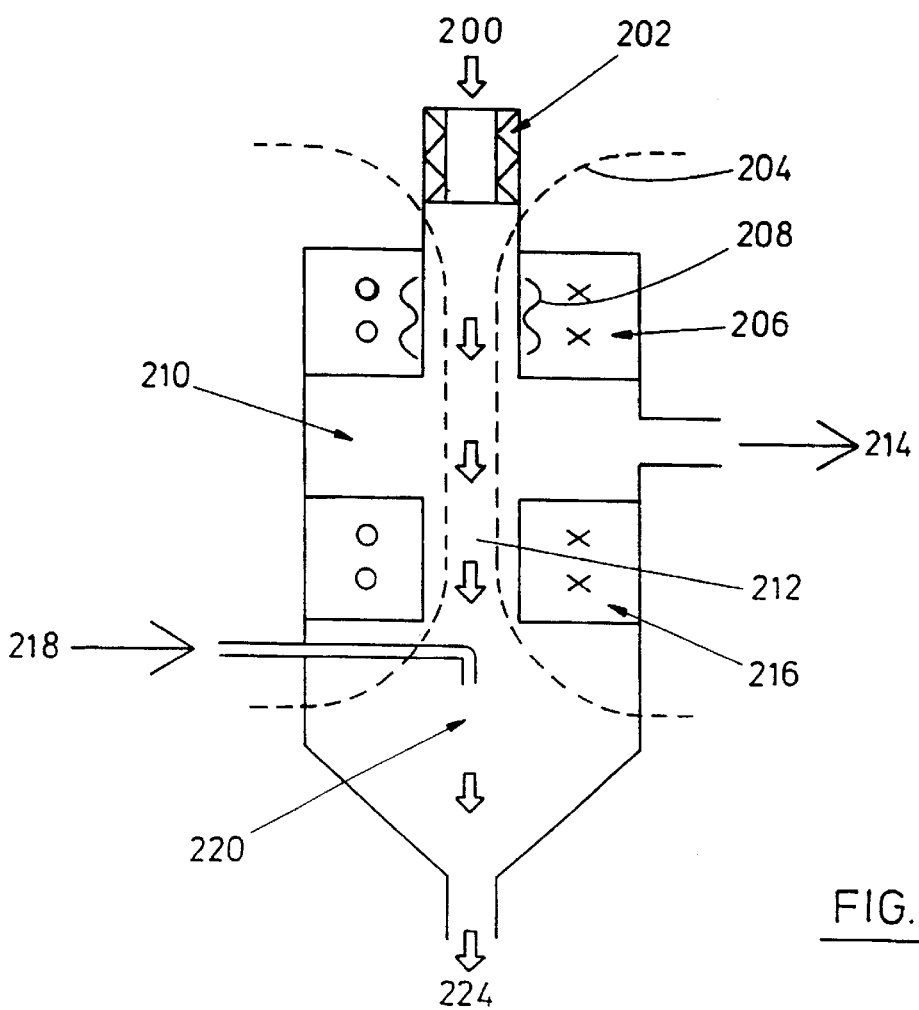

FIG. 4 schematically illustrates a partial view of a second embodiment of the invention;

FIG. 5 schematically illustrates a third embodiment of the invention; and

Figure 6:
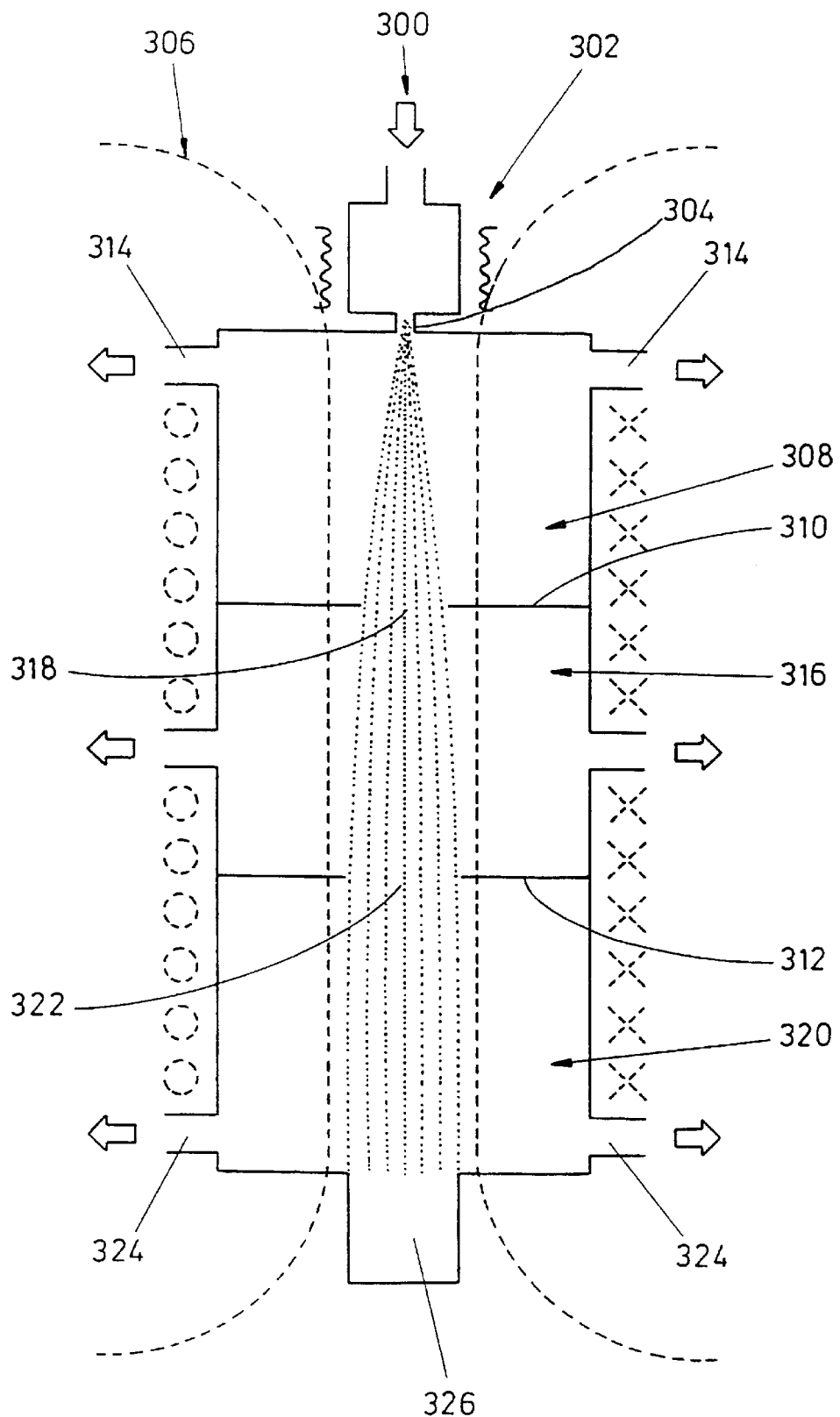

FIG. 6 schematically illustrates a fourth embodiment of the invention.

The techniques of the present invention offer versatile processing systems which can be successfully employed with a variety of starting materials and states and produce a variety of product materials, states and forms.

Uranyl Nitrate Hexahydrate Feed

Figure 1:
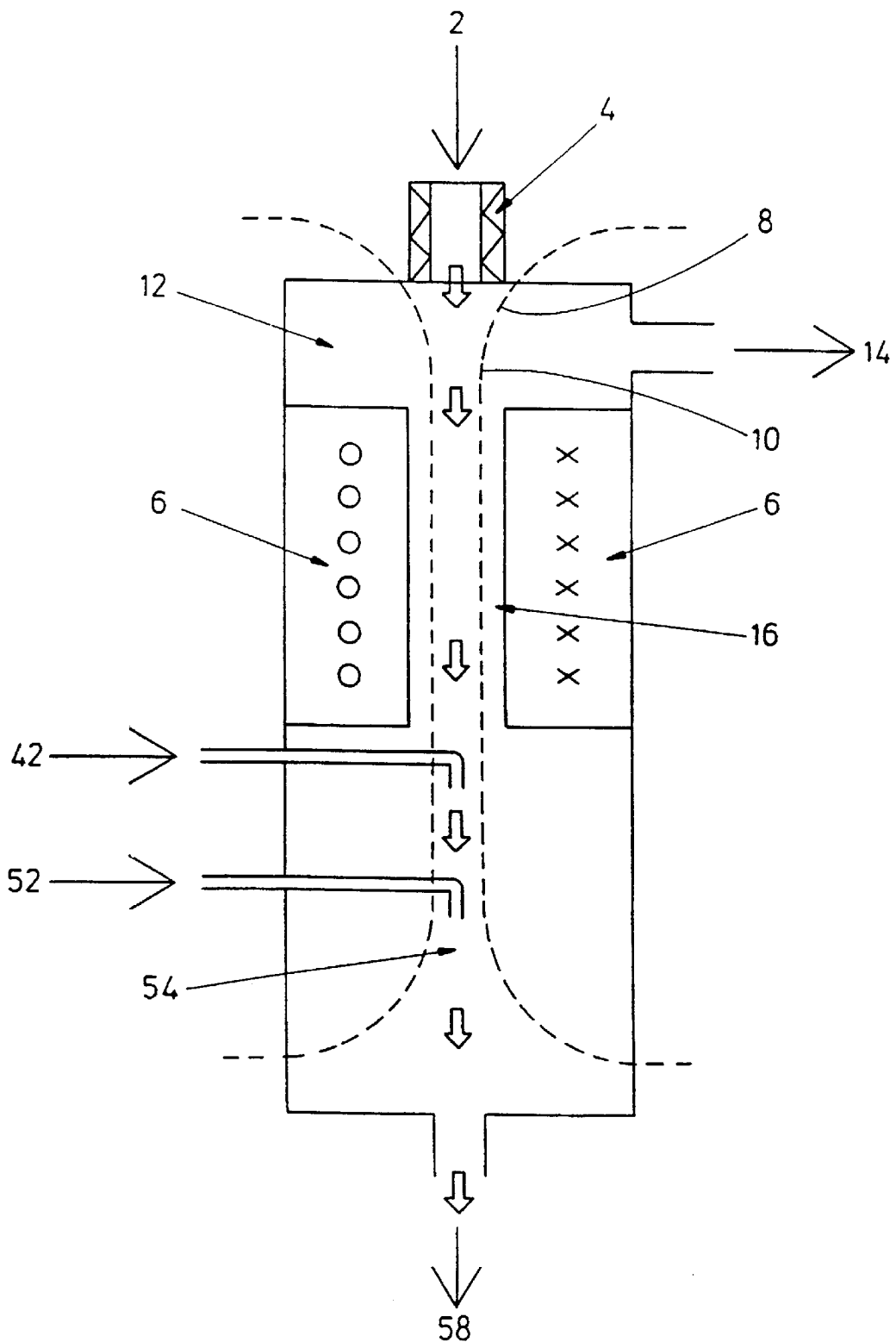
FIG. 1 illustrates schematically a first embodiment of the invention.

As illustrated in FIG. 1 the feed to be processed is introduced according to arrow 2. In this particular example the feed material consists of a uranyl nitrate hexahydrate feed liquor. The feed liquor passes through a plasma generator (4) which rapidly heats the feed liquor to around 4000K. The plasma generator (4) may be a microwave or RF type plasma generator. Control of the plasma temperature can readily be provided.

Conducting solenoids in array (6) produce a high intensity magnetic field whose lines of force are schematically represented (8). By the stage at which the feed is ionised within the plasma generator it is already within the confines of this magnetic field.

The conducting solenoids are set to produce a field intensity in excess of 0.1 tesla.

As a consequence of the plasma generator (4) the feed material enters chamber (12) at a highly elevated temperature. At this temperature the uranyl nitrate hexahydrate breaks down into its component atoms. This allows processing of the feed material according to its individual atomic make up rather than needing an elemental feed or processing the feed only according to differences between the molecules which are either subsequently ionised or not.

Figure 2:
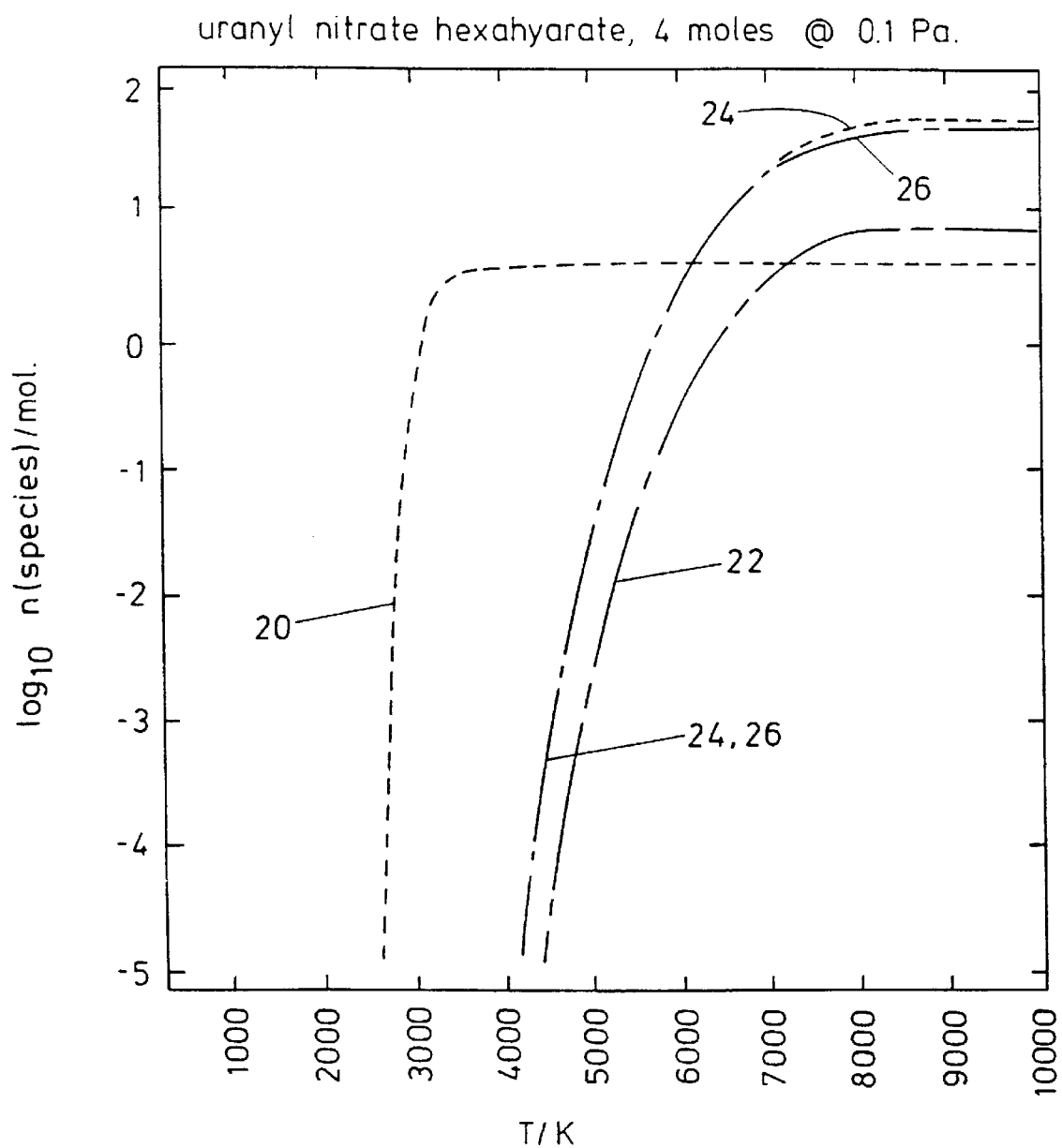
FIG. 2 illustrates a phase diagram for uranium, oxygen, nitrogen and hydrogen.

As can be seen from the phase diagram provided in FIG. 2 at 4000K and under the type of conditions experienced in chamber (12) uranium atoms are charged, U+, line 20. Conversely at this temperature the bulk of the nitrogen, oxygen, and hydrogen are un-charged atoms or molecules as seen by the lines of FIG. 2 which represent the nitrogen, NE line 22; oxygen, O, line 24; and hydrogen, H. line 26; ions all in gaseous form.

The selective ionisation occurs as a result of the overall energy level of the system. Thus the species which are ionised under the prevailing conditions and the species which are not, are determined by the equilibrium state for that species under those conditions. The selective ionisation obtained is, therefore, stable and long lasting allowing the subsequent processing to be carried out without pressure of time.

If energy is only selectively inputted to certain species within the system then selective ionisation can be obtained.

However, collisions between ionised and non-ionised species in such a case result in energy transfer which can result in the ionisation of the previously non-ionised species and/or the discharge of the previously ionised species. In such a case separation must be performed very rapidly or the selective nature will decay prior to any significant selectivity being obtained in the separation.

In the equilibrium state plasma of the present system, collisions are not only tolerable they are desirable to ensure even distribution of the energy input throughout the plasma. Collisions, however, have no detrimental effect as, for example, a collision between a U+ ion and an F atom will, under the equilibrium conditions prevailing result in a U+ ion and a F atom as the most probable outcome. The equilibrium conditions do not provide sufficient energy for the collision to result in electron transfer and discharge of the ion. The potential for allowing collisions also means that the plasma can be operated in a relatively dense state allowing a significant throughput of material. If collisions have to be avoided then as low a density of ions and atoms as possible is desirable to reduce the probability of collisions.

As charged particles the uranium ions are contained by the magnetic field and encouraged to pass onward through the super conducting solenoids (6). The uncharged nature of the nitrogen, oxygen and hydrogen atoms allows them to move freely, unfettered by the magnetic field and they can consequently be "pumped" out of the chamber (12), stream (14). Vacuum pumps can be used for this purpose.

Subsequent cooling of the stream (14) allows these materials to fall back into a recombined equilibrium typically giving $N_2$, $O_2$, and $H_2O$ and oxides of nitrogen.

As a consequence of this aspect of the process the uranium has been separated from the other elements forming the uranyl nitrate hexahydrate feed. Subsequent processing of the separated uranium can be conducted as required.

The strong uniform field present in portion (16) of the procsss strictly confines the uranium ions.

Figure 3:
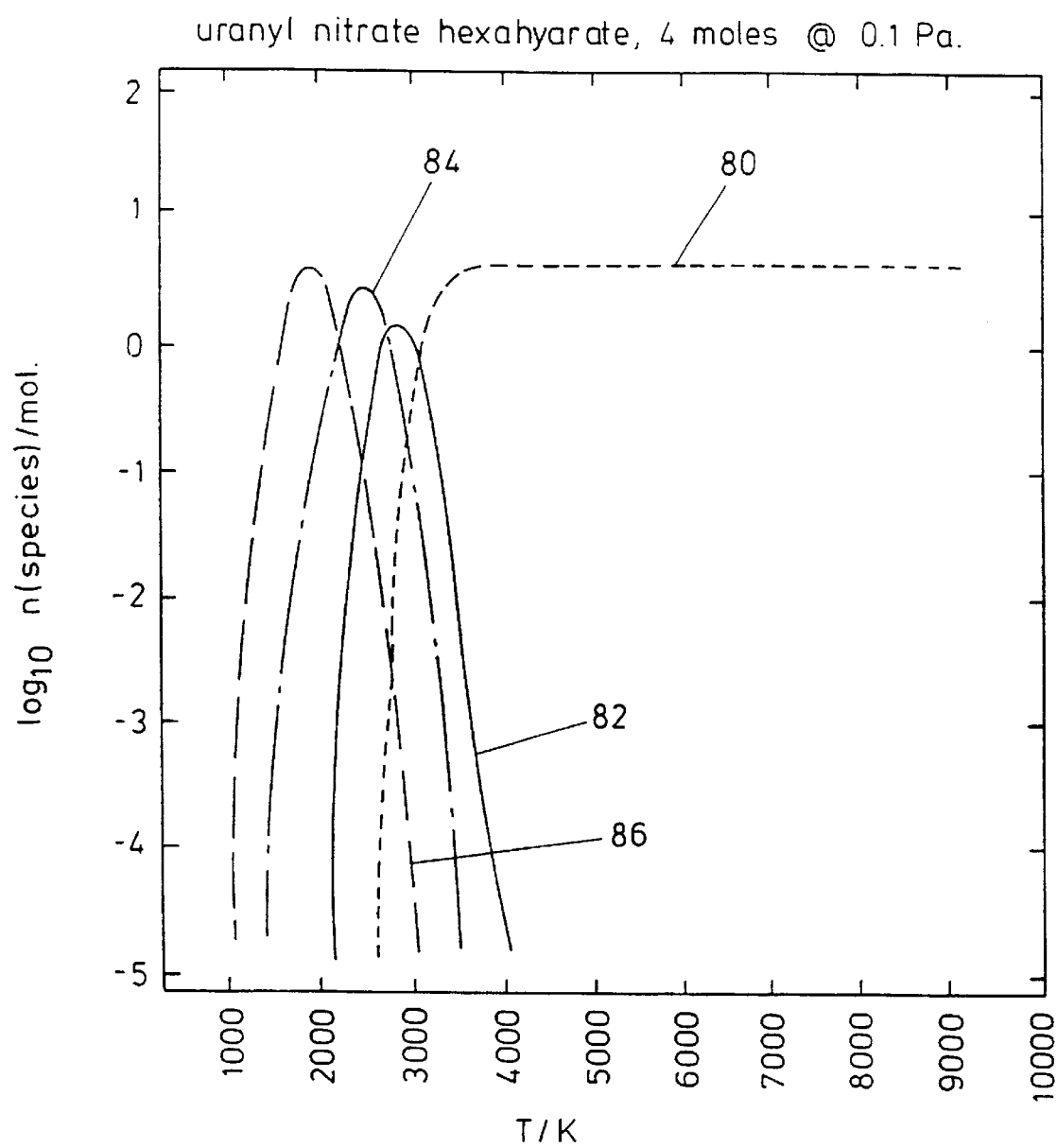
FIG. 3 is a phase diagram for U+, UO, $UO_2$ and $UO_3$.

By introducing an oxygen feed (42) to portion (44) of the process quenching of the U ions occurs. By controlling the quench a reduction in temperature to 2500K can be affected. At this temperature as can be seen from FIG. 3 the predominant form of the material is $UO_2$ gas in an uncharged state, although other uranium oxide forms are likely to be present to a lesser degree. Once again a system in equilibrium is provided.

If desired, as shown in FIG. 1 applying a further quenching stream (52) the temperature can be reduced still further and the uranium oxide rapidly brouight from a gaseous state into a solid state in the form of a ceramic powder, location (54). This exits as stream (58).

The product can be subjected to further subsequent processing, for instance to upgrade it to fuel grade materials.

The process thus provides in a single modular unit for the conversion of uranyl nitrate hexahydrate feed liquor into uranium dioxide powder. A similar result with other feed compounds and/or mixtures of feed compounds can be obtained.

A single modular unit corresponding to this process having an overall length of approximately 10 m and an active region of about 1 m in diameter can process between 50 and 200 kg/hr of feed uranium.

Residence time within the unit is very low, in the order of 10 ms. This time is a reflection of the theoretical average speed at which uranium ions travel at 4000K i.e. $6 \times 10^4$ cm/s.

Spent fuel feed In addition to converting natural uranyl nitrate hexahydrate into fuel grade materials the technique has application in other processing areas including reprocessing products from used fuel rods to extract the desired components.

Spent fuel consists principally of $Uo_2$ powder in combination with various fission products, generally of less than 60 atomic weight, low levels of $^{235}U$ and plutonium. By processing this material into a nitrate liquor and introducing the liquor to the process described above the following separations can be affected.

Applying the apparatus of FIG. 1 once more, in the initial chamber (12) following plasma generation the $^{235}U$ plutonium isotopes and $^{238}U$ (which makes up most of the fuel) all ionise. Most of the fission products, as well as N, H, O, remain in a non-ionised state and consequently are not constrained by the magnetic field. Pumping of these materials out into stream (14) is thus possible.

The product stream (14) may be subjected to further processing, including a further process step or steps according to this-invention to separate components, isotopes or elements of interest from the other species in the stream.

It is then possible to collect and/or subject the product stream (16) remaining in the magnetic field to further processing. The product stream (16) may be quenched as described above to produce a solid product. As far as subsequent processing is concerned the product may be subjected to conventional enrichment techniques. These may be used to separate adequately the $^{238}U$, $^{235}U$ and plutonium isotopes from one another as desired and so achieve a reactor cgrade material.

Titanium Tetrachloride Feed

As illustrated in an alternative embodiment, partial view, in FIG. 4 the feed material may be provided with an additional system to provide or ensure the required ionisation of the selected component or components.

In this particular example the feed material consists of titanium tetrachloride and the desired product is titanium metal, but the technique is equally applicable to a wide range of feed materials.

In this unit the feed (2) passes through a plasma generator (4) and is contained in a magnetic: field (8) The plasma temperature is such that the feed materials are reduced to discrete atoms and may be partially ionised.

In this form the feed then passes through an electron cyclotron resonance unit (102) which causes further energy input to the plasma due to collision of the high energy electrons with the components. According to the appropriate phase diagrams and at the energy level of collisions provided, as a consequence of the overall energy level of the system certain components, titanium in this case, are ionised whereas others, chlorine, remain in un-ionised form. The selective ionisation is due to the equilibrium states of the species, between ionised and non-ionised, which prevail.

The material then passes into chamber (12) where the uncharged chlorine can be removed from the magnetic field as process stream (14). The chlorine can be recycled to earlier stages in the overall process involved in the production of titanium tetrachloride.

The remaining component, titanium, and processing steps may be treated as presented in FIG. 1 or subjected to other processing.

Uranium Metal Production

The technique in another embodiment, as illustrated in FIG. 5, also offers a convenient production technique for uranium metal. It is equally applicable for the recovery of other elements by the separation of other feed materials into its constituent elements.

Conventional techniques employ the type of concentration, denitration, reduction and hydrofluorination techniques discussed above before the uranium fluoride is converted to metallic form by reacting it with magnesium.

The present process on the other hand offers a convenient way for separating the uranium metal from the uranyl nitrate hexahydrate feed.

Uranyl nitrate hexahydrate feed (200) Ls introduced into the apparatus. The feed consists elementally of uranium, nitrogen, oxygen and hydrogen. The microwave or RF type plasma generator (202) very rapidly subjects the feed to a temperature of around 4000K.

Even with a short residence time this is sufficient to break the feed material down into its discrete elemental forms and in many cases down to discrete atoms. Thus the feed is conrted to U, N, $N_2$, $O_2$, H etc. with some U+. The atomised feed is contained in the plasma, the plasma being contained by the magnetic field (204) generated by magnets (206).

Whilst the plasma itself may have caused partial ionisation of some of the elements present, an electron cyclotron resonance aerial (208) is provided to cause the desired degree of ionisation. The aerial (208) imparts energy to electrons present within the plasma and the increased energy of the electrons is such that on collision with the components of the feed energy is transferred. According to the equilibrium applicable to the species involved in the collision under the prevailing conditions, ionisation occurs for some components, but not for others. The likelihood of ionisation for the various parts of the feed varies in the manner discussed above. Thus uranium for instance is ionised at a lower energy level of electron excitation than oxygen, hydrogen and the like.

As a consequence, by the time the process stream reaches chamber (210) it consists of the ionised and un-ionised components. The un-ionised components can be pumped out of the chamber (210) into product stream (214) as they are not restrained by the magnetic field. The charged components, principally uranium, continue on in the process stream (212) with the plasma being contained by further magnets (216).

Introduction of a chemical material (218) into the stream (212) effects the desired reaction or phase change on the separated charged components. Thus by providing argon at a relatively low energy level, for instance TOOK the charged components can be converted to un-charged components and into the product form very rapidly due to the collision between the cool stream (218) and the stream (212). In the embodiment shown, this transition is shown as being affected by one chemical material introduction stage but a first-stage to convert the material from charged to un-charged form and a second to convert it from a gaseous to solid form is also envisaged. The inert nature of the gas added gives cooling without the risk of chemical combination with the uranium. Uranium metal thus results.

The nature of the chemical material (218) and the energy level at which it is added can be used to control the form, structure, and chemical composition of the product originating in chamber (220) and in the product stream (224). Thus the introduction of oxygen could be used to convert the uranium for instance into $UO_2$ as an alternative to the careful control of the energy level with regard to oxygen introduced or the introduction of an inert gas to reduce the uranium ions to uranium metal forms.

A similar process route can be used to produce uranium metal starting from uranium tetrafluoride produced during the hydrofluorination stage discussed above in relation to the extraction of uranium from primary sources.

Processing of the first product stream (214) to make use of the elemental constituents is also envisaged. For instance, in this case fluorine can be recovered from the stream for subsequent reuse in the earlier stages of the material processing.

Uranium Hexafluoride Feed

In an alternative process using this technique the feed material (200) consists of uranium hexafluoride. Selective ionisation of this feed leads to charged uranium ions and uncharged fluo ne atoms. The separation of these in chamber (210) leads to an uranium ion stream (212) and fluorine stream (214). The subsequent production of uranium metal as product (224) and the re-use of the fluorine either in the nuclear fuel processing cycle or in other applications is possible.

The application of this process is particularly envisaged for treatment of the depleted stream leaving the chemical or physical enrichment process discussed above. The depleted stream contains uranium hexafluoride, the concentration of $^{235}UF_6$ in which is low, the $^{235}UF_6$ have been extracted as far as possible for further use, the vast majority of the uranium hexafluoride being $^{238}UF_6$. Presently this material has no significant use and is stored as uranium hexafluoride over long periods. Uranium hexafluoride is relatively volatile and not an ideal storage form.

The present technique offers the possibility of taking this depleted stream, or stored amounts of this product, and processing it to obtain useful materials. The liberated fluorine can be returned to the processing cycle for reuse, for instance, and the new end product, uranium metal is presented in a more readily and conveniently stored form or is made available for use.

Fluorine and depleted U metal can therefore be produced.

By controlling the chemical species added to the uranium ions, for instance during a quench, other compounds can also be generated, for instance uranium nitride, uranium carbide and uranium oxide products can all be made.

A further embodiment of the invention is illustrated schematically in FIG. 6 in illustrating a further apparatus. The description of the device will be made in relation to separating uranium from uranium hexafluoride feed, but other applications can readily be made for this apparatus.

The uranium hexafluoride feed liquor is introduced in stream (300) as a vapour. The feed is rapidly converted to a plasma by a radio frequency plasma generator (302). The plasma generator operates at 2 KPa in order to ensure essentially equilibrium ionisation levels for the desired components of the feed due to high levels of collisions.

Contact parts within the plasma generator may be formed from ceramic fluorides in order to give the necessary physical properties to withstand the conditions involved. The system may employ copper surface which is cooled by contact with water containing tubes. The water flow is used to lower the temperature of the copper walls and gives rise to condensation of the uranium fluoride forms on the walls. This chemically and thermally insulates the copper. Eventually an equilibrium state develops with a given thickness of the uranium fluoride deposited on the wall. A self-lining effect is thus provided.

The plasma generated exits the generator (302) through nozzle (304) and is contained by magnetic field, schematically illustrated (306). An approximately 30 mm radius nozzle is used to maintain the pressure within the plasma generator (304) and to give the desired flow rate.

On leaving the plasma generator and entering zone 1 (308) the plasma will expand giving rise to cooling. However, the work done against the magnetic field by the uranium ions will result in partial re-heating. If appropriate additional energy can be introduced into the plasma during its subsequent progress through the apparatus to maintain the temperature at a level on which the desired components remain ionised. This energy may be provided by radio frequency means. The desired selectivity based on an equilibrium is thus maintained.

The beam of material leaving the plasma generator tends to fan out as the distance from the plasma generator increases.

The barriers (310, 312) defining the various zones take this expansion into account in their selected aperture diameters.

The containing field is approximately 0.1 tesla in strength. Such levels can be provided by conventional electro magnetics although super conducting magnets may be employed. A magnetic field of this strength confines the uranium ions to a radius of 180 mm or so following a travel distance of 3 m from the nozzle. The zones/stages are each 1 m in length. The radius of the expanding beam is approximately proportional to the fourth root of the distance travelled.

Within zone 1 (308) outlets (314) to a vacuum pump, not shown, are provided. These allow first waste streams to be drawn off from the apparatus, the waste streams comprising non-charged material, principally fluorine. Aluminium may be used for the waste stream lines.

The pressure in zone 1 is around 13 Pa and during its travel through that zone the fluorine pressure in the material beam reduces substantially to that pressure. The excess fluorine over this is pumped off through outlets (314) using commercially available pumps.

The reduced fluorine content beam then passes into zone 2 (316) through the gap (318) in barrier (310).

The second zone (318) is operated at a lower pressure than the first, approximately 5 Pa and once again the fluorine content in the beam reduces towards this pressure as the material passes through the zone.

The beam then passes into zone 3 (320) through gap (322) in barrier (312).

This zone is again operated at a still lower pressure, approximately 2 Pa, with the excess fluorine being pumped off through outlets (324).

The significantly depleted fluorine bean, then passes on to outlet (326) for subsequent handling.

The ionised, gaseous uranium may, be contacted With a grid of some description to discharge the charge and reduce the energy of the uranium to a state in which it is solid or liquid. The introduction of chemical materials to effect a quenching and/or cooling action may be considered. In this regard the use of inert gases to cool the uranium may be preferred so that a chemical combination with the gases does not occur. Metallic uranium arises as a result. The uranium may be cooled sufficiently to provide it as a solid or alternatively may only be partially cooled to leave it in liquid form.

The fluorine remaining in the uranium product stream (326) may be readily volatised, as a uranium fluoride, from the bulk of the uranium product and recycled. When the uranium is collected as a liquid the separation may conveniently be carried out in situ. The volatised UF will largely be converted to $UF_6$ which can be recycled.

Similar separations are possible for $UF_4$, $TiCl_4$ and other metal halides.

Provision for collecting fluorine released from the liquid by off gassing may be provided.

Ceramic fluoride or graphite materials may be used to form the liquid collection vessel.

For a 12 kg uranium per hour feed a 5.7 kg/hr fluorine feed arises. Of this fluorine 3.6 kg/hr is expected to be pumped off from zone 1; 1.3 kg/hr pumped off from zone 2; 0.5 kg/hr pumped off from zone 3; and 0.3 kg/hr to remain in the uranium product stream (326). Off gassing of the fluorine from this product as $UF_3$ and/or $UF_4$ results in a very pure uranium product, Ie, a fluorine content in the parts per million range.

The various embodiments set out herein are closely related to each other and it should be appreciated that features discussed explicitly with regard to one or more aspects or embodiments are applicable to the others also.

What is claimed is:

1. A process for separating desired components in a feed mixture comprising the steps of:

providing a feed, the feed including a plurality of mixed components, each component having a corresponding first thermal energy;

applying energy to the entire feed such that each of the mixed components has a corresponding second thermal energy that is greater than the corresponding first thermal energy, the second thermal energy being sufficiently high to convert said feed into a plasma or ionized form;

the conversion of said feed into a plasma or ionized form providing at least one component of the mixed components in at least partially ionized form and at least one different component of the mixed components in at least partially non-ionized form, the second thermal energy of the component in the ionized form being substantially same as the second thermal energy of the component in the non-ionized form;

containing said plasma/ions in a magnetic field; and separating said ionized components from said non-ionized components when the ionized and non-ionized feed components are in substantially thermal equilibrium with one another for prevailing conditions.

2. A process according to claim 1 in which the process further comprises converting at least some of the separated ionized component or components to a non-ionized form.

3. A process according to claim 2 in which at least one of the components is collected, the temperature conditions being controlled to purify the collected component by vaporizing of impurities.

4. A process according to claim 3 in which the impurities are vaporized in the form of compounds with the collected component and/or metal.

5. A process according to claim 2 in which the component is converted to non-ionized form by reducing its kinetic energy level.

6. A process according to claim 2 in which the component is converted to non-ionized form by impacting it on a surface.

7. A process according to claim 2 in which the component is converted to non-ionized form by addition of a chemical material.

8. A process according to claim 7 in which the chemical material is added at a predetermined kinetic energy level so as to give the desired non-ionized form in a gaseous form.

9. A process according to claim 7 in which the addition of the chemical material, or the addition of further chemical material in a further stage, is such so as to reduce the kinetic energy level to a stage where a solid product is produced.

10. A process according to claim 1 in which the ionization of the components is caused by the temperature of the plasma.

11. A process according to claim 1 in which the ionization of the components is caused by the interaction of the components with high energy electrons produced by electron cyclotron resonance.

12. A process according to claim 1 in which the ionization is controlled by the level of energy input.

13. A process according to claim 1 in which the energy input is not selective between components of the feed.

14. A process according to claim 1 in which the separation of ionized and un-ionized components is affected by removing the un-ionized component from the plasma, whereas the ionized component is restrained by the magnetic field.

15. A process according to claim 1 in which separation is affected in a plurality of stages and in which the stages are operated at different pressures to one another, the pressure in one or more stages near to the inlet thereof being higher than one or more further away from the inlet.

16. A process according to claim 15 in which three stages arc provided, the first zone is operated at between 10 and 50 Pa, the second zone is operated at between 5 and 20 Pa and the third zone is operated at between 2 and 10 Pa.

17. A process according to claim 1 in which the method comprises the further step of introducing a chemical material, at a given kinetic energy level, and contacting this with the remaining ionized component(s), the kinetic energy level of the ionized component and chemical material being such that a non-ionized component or particle results.

18. A process according to claim 17 in which the components and further chemical material are combined in the resulting particle.

19. A process according to claim 1 in which the component desired is extracted from a mixture of isotopes and/or elements of both metal and non-metal nature.

20. A process according to claim 1 in which the feed is provided in gaseous form by a process selected from the group consisting of boiling, evaporation, sublimation, and combinations thereof of a solid or liquid initial feed.

21. A process according to claim 1 in which some or all metallic elements present in said feed are ionized.

22. A process according to claim 21 in which metallic elements with an atomic weight greater than 90 are ionized.

23. A process according to claim 1 in which the feed is provided in molecular form and selectively separated as discrete atoms.

24. A process according to claim 1 in which the feed is introduced into the containing magnetic field in non- ionized form.

25. A process according to claim 1 in which the separated non-ionized components are recycled for subsequent use and/or subjected to further processing.

26. A process according to claim 1 in which the ionized components are cooled, and/or discharged to provide a liquid or solid uncharged product.

27. A process according to claim 1 in which the feed includes spent nuclear fuel, uranium tetrafluoride, metal halides, titanium tetrachloride.

28. A process for separating desired chemical species in a feed mixture:

heating an entire feed of mixed chemical species to a predetermined temperature such that each of the chemical substantially the same thermal energy, the feed including a first chemical species and a second chemical species, the predetermined temperature being sufficient to convert the read into a plasma or ionized form such that the first chemical species is substantially ionized and the second chemical species is substantially non-ionized;

containing the plasma/ions in a magnetic field; and substantially separating the non-ionized second chemical specks from the ionized first chemical species contained in the magnetic field.

29. A process according to claim 28, wherein the act of heating includes heating the entire feed to a temperature in a range between about 3,000 K to about 4,500 K.

30. A process according to claim 28, comprising:

a plurality of discrete chemical species of the teed being substantially ionized and a plurality of discrete chemical species of thc feed being substantially non-ionized; and substantially separating the non-ionized chemical species from the ionized chemical species contained in the magnetic field.

31. A process accordingly to claim 28, the act of separating comprises pumping the non-ionized second chemical species away from the first chemical species when the plasma/ions are in the magnetic field.

32. A process according to claim 28, wherein the mixed chemical species are selected from discrete elements.

33. A process according to claim 28, wherein the separated non-ionized second chemical species is removed as a final product separate from the ionized first chemical species.

* * * * *

UNITED STATES PATENT AND TRADEMARK OFFICE
CERTIFICATE OF CORRECTION

PATENT NO. : 6,267,850 B1
DATED : July 31, 2001
INVENTOR(S) : Geoffrey Horrocks Bailey et al.

It is certified that error appears in the above-identified patent and that said Letters Patent is hereby corrected as shown below:

<u>Title page,</u>
Item [56], OTHER PUBLICATIONS, reference "Isotope Seperation", after "Liquids" change "adn" to -- and --

<u>Column 2,</u>
Line 41, after "feed are" change "Ionised" to -- ionised --
Line 45, after "below" delete ","

<u>Column 3,</u>
Line 55, before "separated" change "maybe" to -- may be --

<u>Column 4,</u>
Line 51, before "a further" change "Which" to -- which --

<u>Column 6,</u>
Line 34, after "steps" change "or:" to -- of: --

<u>Column 7,</u>
Line 11, before "preferred" change "aparticularly" to -- a particularly --
Line 34, before "introduced" change "he" to -- be --

<u>Column 8,</u>
Line 1, before "sixth" change "an" to -- a --
Line 52, after "nitrogen," change "NE" to -- N, --
Line 53, after "hydrogen," change "H." to -- H, --

<u>Column 9,</u>
Line 5, after "system" delete ","
Line 35, before "strictly" change "procsss" to -- process --
Line 44, after "FIG. 1" insert a comma
Line 46, after rapidly change "brouight" to -- brought --
Line 63, after "feed" begin a new paragraph <u>Column 10,</u>
Line 1, before "powder" change "Uo$_2$" to -- UO$_2$ --
Line 16, before "to separate" change "this-invention" to -- this invention --
Line 26, after "reactor" change "cgrade" to -- grade --
Line 37, after "contained in a" change "magnetic: field (8)" to -- magnetic field (8). --

UNITED STATES PATENT AND TRADEMARK OFFICE
CERTIFICATE OF CORRECTION

PATENT NO. : 6,267,850 B1
DATED : July 31, 2001
INVENTOR(S) : Geoffrey Horrocks Bailey et al.

It is certified that error appears in the above-identified patent and that said Letters Patent is hereby corrected as shown below:

Column 11,
Line 4, before "introduced" change Ls" to -- is --
Line 12, before "to U," change "conrted" to -- converted --
Line 39, after "instance" change "TOOK" to -- 100K, --

Column 12,
Line 5, after "uncharged" change "fluo ne" to -- fluorine --

Column 13,
Line 39, after "fluorine" change "bean" to -- beam --
Line 41, after "contacted" change "With" to -- with --

Column 14,
Line 3, after "product," change "le," to -- i.e., --
Line 28, after "substantially" insert -- the --

Column 15,
Line 15, before "provided" change "arc" to -- are --

Column 16,
Line 12, before "substantially" insert -- species have --
Line 15, after "convert the" change "read" to -- feed --
Line 22, before "from" change "specks" to -- species --
Line 27, before "comprising" insert -- further --
Line 28, before "being" change "teed" to -- feed --
Line 30, before "feed" change "thc" to -- the --

Signed and Sealed this

Twenty-fifth Day of February, 2003

JAMES E. ROGAN
*Director of the United States Patent and Trademark Office*